US 6,564,243 B1

(12) United States Patent
Yedidia et al.

(10) Patent No.: US 6,564,243 B1
(45) Date of Patent: May 13, 2003

(54) METHOD AND SYSTEM FOR INJECTING EXTERNAL CONTENT INTO COMPUTER NETWORK INTERACTIVE SESSIONS

(75) Inventors: Meir Yedidia, Kirat Ono (IL); Yaron Buznach, Tel Aviv (IL)

(73) Assignee: Adwise Ltd., Tel Aviv (IL)

( * ) Notice: Subject to any disclaimer, the term of this patent is extended or adjusted under 35 U.S.C. 154(b) by 0 days.

(21) Appl. No.: 09/543,669

(22) Filed: Aug. 20, 1999

Related U.S. Application Data

(60) Provisional application No. 60/100,114, filed on Sep. 14, 1998.

(51) Int. Cl.[7] .............................................. G06F 15/16
(52) U.S. Cl. ...................... 709/203; 704/217; 704/225; 704/229; 704/245
(58) Field of Search ............................... 709/200–203, 709/217–219, 225–229, 245–246, 105; 713/200–201

(56) References Cited

U.S. PATENT DOCUMENTS

| 5,548,724 A | * | 8/1996 | Akizawa et al. ............. 709/203 |
| 5,572,643 A | | 11/1996 | Judson |
| 5,603,029 A | * | 2/1997 | Aman et al. ................. 709/105 |
| 5,606,668 A | | 2/1997 | Shwed |
| 5,928,363 A | | 7/1999 | Ruvolo |
| 6,073,168 A | * | 6/2000 | Mighdoll et al. ............. 709/217 |
| 6,345,300 B1 | * | 2/2002 | Bakshi et al. ............... 709/229 |
| 6,353,848 B1 | * | 3/2002 | Morris ........................ 709/203 |
| 6,385,647 B1 | * | 5/2002 | Wilis et al. .................. 709/217 |
| 6,415,323 B1 | * | 7/2002 | McCanne et al. ............ 709/225 |

FOREIGN PATENT DOCUMENTS

WO      WO 99/16003 A1    4/1999

OTHER PUBLICATIONS

Kohda, Y. et al.: "Ubiquitous Advertising on the WWW: Merging Advertisement on the Browser" Computer Networks and ISDN Systems, (1996), vol. 28 pp. 1493–1499.
Cooper, L.F.: "More than just hits Web Advertising," Dec. 2, 1996, Informationweek, U.S., Manhasset, N.Y. pp. 63, 68, 72.

* cited by examiner

Primary Examiner—Bharat Barot
(74) Attorney, Agent, or Firm—Mark M. Friedman

(57) ABSTRACT

A method and system for injecting external content to a user's client computer engaged in an interactive computer network session. A request for selected content from a user is intercepted and a decision is made whether to deliver external content to the user's client computer in addition to the requested content. The method and system allows for local service providers such as ISPs to add their own content to sessions involving remote content suppliers.

38 Claims, 14 Drawing Sheets

Fig. 1 (PRIOR-ART)

IP Header

| 4 bit version | 4 bit header length | 8 bit type of service (TSO) | 16-bit total length (in bytes) | |
|---|---|---|---|---|
| 16-bit identification ||| 3- bit flags | 13-bit fragment offset |
| 8-bit time to live (TTL) | 8-bit protocol || 16-bit header checksum ||
| 32-bit source IP address |||||
| 32-bit destination IP address |||||
| Options (if any) |||||
| data |||||

UDP Header

| 16-bit source port number | 16-bit destination port number |
|---|---|
| 16-bit UDP length | 16-bit UDP checksum |
| Data (if any) ||

TCP Header

| 16-bit source port number || 16-bit destination port number ||
|---|---|---|---|
| 32-bit sequence number ||||
| 32-bit acknowledgment ||||
| 4 bit header length | reserved (6 bits) | flags | 16-bit window size |
| 16-bit TCP checksum ||| 16-bit urgent pointer |
| Options (if any) ||||
| Data (if any) ||||

Fig. 4B

Upstream Traffic generated by the client

Downstream Traffic response from servers to a client

Traffic from the content injector to the client

METHOD AND SYSTEM FOR INJECTING EXTERNAL CONTENT INTO COMPUTER NETWORK INTERACTIVE SESSIONS

CROSS REFERENCE TO RELATED APPLICATION

This application is based on and claims priority to provisional patent application serial No. 60/100,114, filed on Sep. 14, 1998.

BACKGROUND OF THE INVENTION

The present invention is directed generally to a system and method for injecting external customized content into an interactive computer network session, and, in particular, to such a system and method which provides the display of additional content on a user's Internet web browser other than that content actually requested by the user during an interactive session.

Presently, it is acceptable that Internet web servers contain web pages with content to be requested by a user. The requested content is generally of interest to the user, such as home pages or the like, and may often include other content, such as for example, advertisements and messages, on the same web page. Users who wish to obtain content on their client computer from a remote server through a global computer communication network such as the Internet, generally must connect through an Internet Service Provider (ISP) who serves as a connection point to the global network, such as the Internet, and provides the routers to direct the user's request to the appropriate web page server. A glossary of relevant communication and Internet terms as used herein is provided at the end of the present specification.

Currently, the ISP does not control client requests from a user, nor remote server content. Such a client request merely passes through the ISP's communication junction. Nevertheless, the ISP may have a business interest to attract its customers' attention by providing or injecting its own content during a user interactive session.

Generally, the ISP forwards client requests and remote server content in a transparent way. The ISP can encourage its customers to use its portal or ISP home page, or can use "push technology" in order to attract the client's attention and deliver content to them. Push technology implements a method in which the ISP or a third party can send special content to a user who preinstalls push client software or who preconfigures their computer/network device to receive that special content. Whether using the portal or push method, the ISP or the third party relies upon the user's full consent and cooperation in using the push client software to view the pushed content. An exemplary push product is available, for example, from Backweb Ltd. of Tel-Aviv, Israel.

Communication between devices over a network is conducted using a communication protocol. For example, communication over the Internet uses Transport Control Protocol/Internet Protocol (TCP/IP). A protocol is charted by layers as per the open system interconnection (OSI) communication layer model. Various network devices use different layers of the OSI. Certain Internet based systems extract data from a limited number of layers. Shwed U.S. Pat. No. 5,606,668, for example, describes a "firewall" system based on data from two of the communication layers. A router, for example, by Cisco Inc, USA uses data from only one layer.

Typically, when a user requests content by entering an Internet address such as a Uniform Resource Location (URL) or domain name to receive a web page, there is some delay in delivering and displaying the web page on the user's web browser. The same is true when a hyperlink on a web page is activated. Judson U.S. Pat. No. 5,572,643 recognizes such retrieval delay and deals with it by providing the display of information, pre-loaded or stored on the user's computer. In particular, the patent uses information embedded in the hyperlink itself to display during the delay period.

Accordingly, it would be desirable to provide content to the user when the request for a web page is made, but content provided from a source other than the web server from which the client's request for content is made.

The system and method presented herein allows for external information to be added in a controlled manner to interactive sessions conducted by local users such as an Internet user, with a remote server, without any client or servers/special setup or configuration.

SUMMARY OF THE INVENTION

Generally speaking, in accordance with the present invention, a system and method of delivering localized or external content to a user's client computer, is provided. The client computer is adapted to transmit requests for selected content and to allow downloading of requested selected content from a selected location. The request for selected content is intercepted upon delivery to the selected location. The local or external content is delivered to the user's client computer in addition to delivery of the selected content.

In a preferred embodiment, the user's client computer includes an Internet web browser for browsing the Internet by requesting selected content from a specified address location. Upon such request being received at an ISP, a decision is made based on predefined criteria whether to deliver additional content to the user's client computer. The additional content is supplied from a source other than the specified address location.

Accordingly, it is an object of the present invention to provide a system and method for inserting customized content into an interactive communication session, without changing content provided by remote sites and without having any noticeable effect on performance as it is perceived by the end-user/client.

A further object of the present invention is to provide a generic, intelligent point of intervention into interactive sessions that allows applying various intervention schemes according to end-user communications attributes and to particular activity attributes.

Another object of the present invention is to provide a method for monitoring client and server interaction, using all ISO model communication layers and acting accordingly.

Yet another object of the present invention is to provide to an ISP a method for adding content to a user's browser while processing a client request without depending on any pre-configuration/installation on the client or remote server side.

Still other objects and advantages of the invention will in part be obvious and will in part be apparent from the specification.

The invention accordingly comprises the several steps and the relation of one or more of such steps with respect to each of the others, and the system embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4B depicts the various header formats for several Internet protocols;

DETAILED DESCRIPTION OF THE PREFERRED EMBODIMENTS

Figure 1:
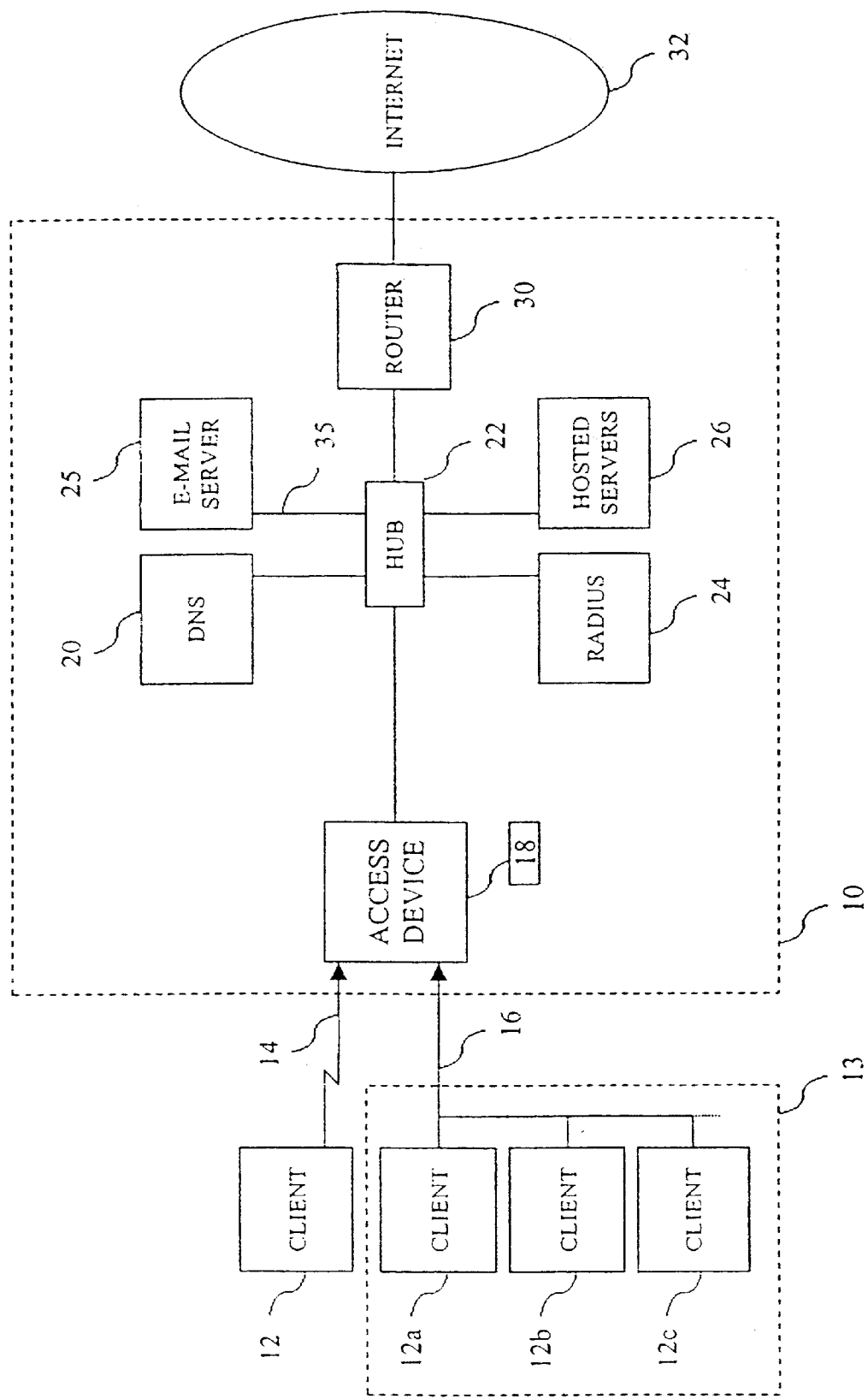
FIG. 1 is a flowchart representation of a typical global communications network in accordance with the prior art.

Reference is first made to FIG. 1 of the drawings which depicts a typical ISP junction in accordance with the prior art. In such a typical ISP junction, the main ISP site, generally indicated at 10 includes an ISP access device 18 which allows, for example, a dial-in access through a modem or the like, direct access through a router or any other communication means, thereby enabling a client 12, or a network 13 of clients 12a, 12b, 12c to connect to ISP junction 10. The site also includes a hub 22, a domain name server (DNS) 20, client access control such as a Radius 24, an e-mail server 25, hosted servers 26, and a router 30 which connects the ISP junction to global computer networks such as Internet 32. Generally, the identified named ISP devices are connected together via network such as a local area network (LAN). It is noted that the particular configuration is shown as an example only and other ISP network configurations can be used with the present invention. The arrangement and set up of such configurations are well know to those skilled in the art. The present invention, as described below in detail can be used in conjunction with any of these possible configurations.

Each client 12 is generally a computer such as a PC or laptop with video and audio capabilities, having a processor and programs or applications associated therewith. Internet 32 is a networked collection of clients and servers which are adapted through software and communication links to communicate with one another. The clients, typically through a browser program, can send a request message to a server and await a response. The response is displayed or presented by the browser. For a more detailed description of the Internet, browsers, Internet communication and protocols, reference is made to Ruvolo U.S. Pat. No. 5,928,363, the description therein being incorporated by reference herein as though fully set forth.

Figure 2:
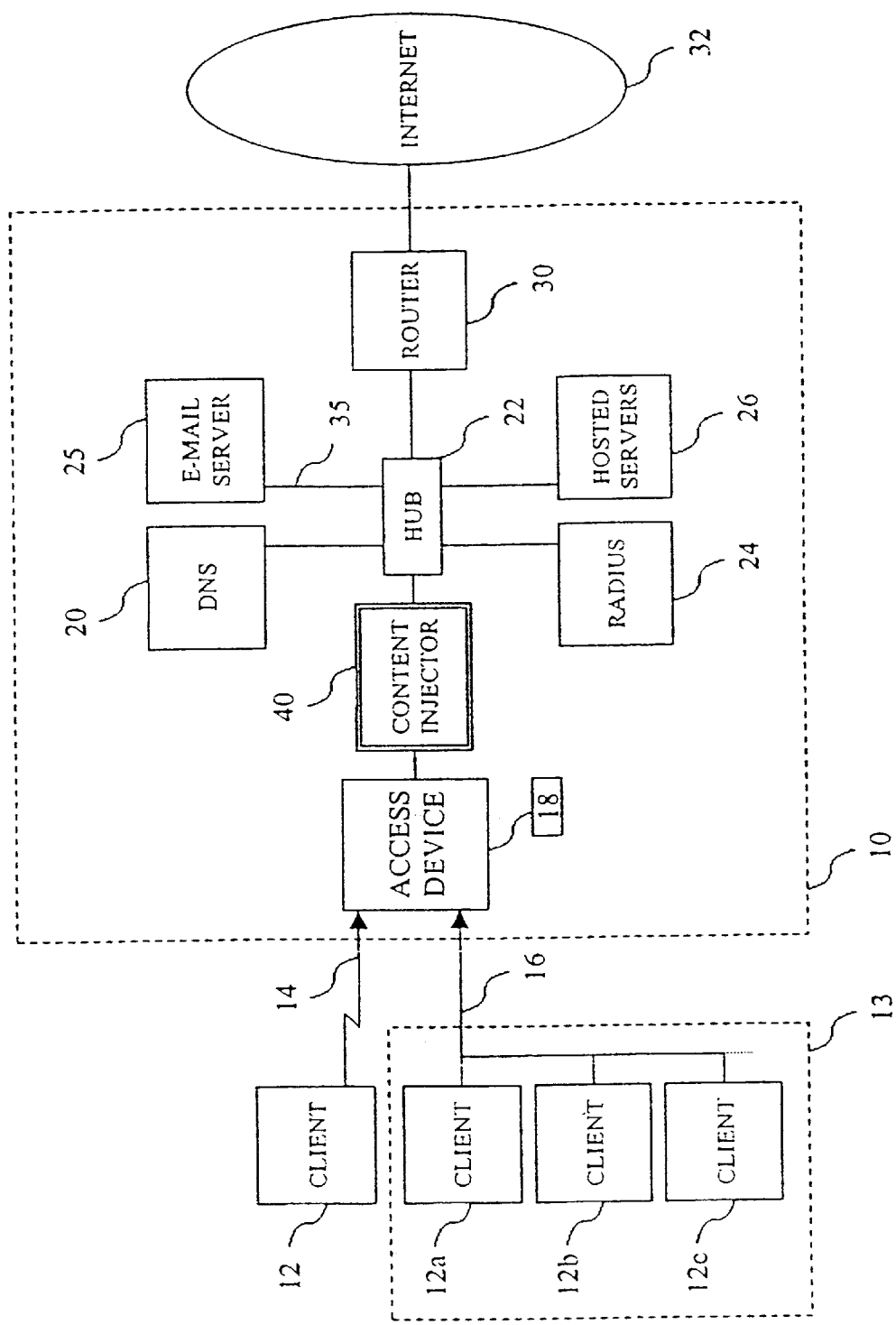
FIG. 2 is a flowchart representation of a global communications network in accordance with a preferred embodiment of the present invention.

FIG. 2 depicts the network configuration of FIG. 1 in which a content injector system, generally indicated at 40, and constructed in accordance with the present invention, has been installed. Like elements in FIG. 2 as shown in FIG. 1 have the same reference numbers. It is noted that content injector 40 is provided in ISP junction 10 in this embodiment, however, content injector 40 may also be provided in other places, such as between network 13 and ISP junction 10 or between client 12 and ISP junction 10. The present invention may be used with any of these configurations.

Figure 3:
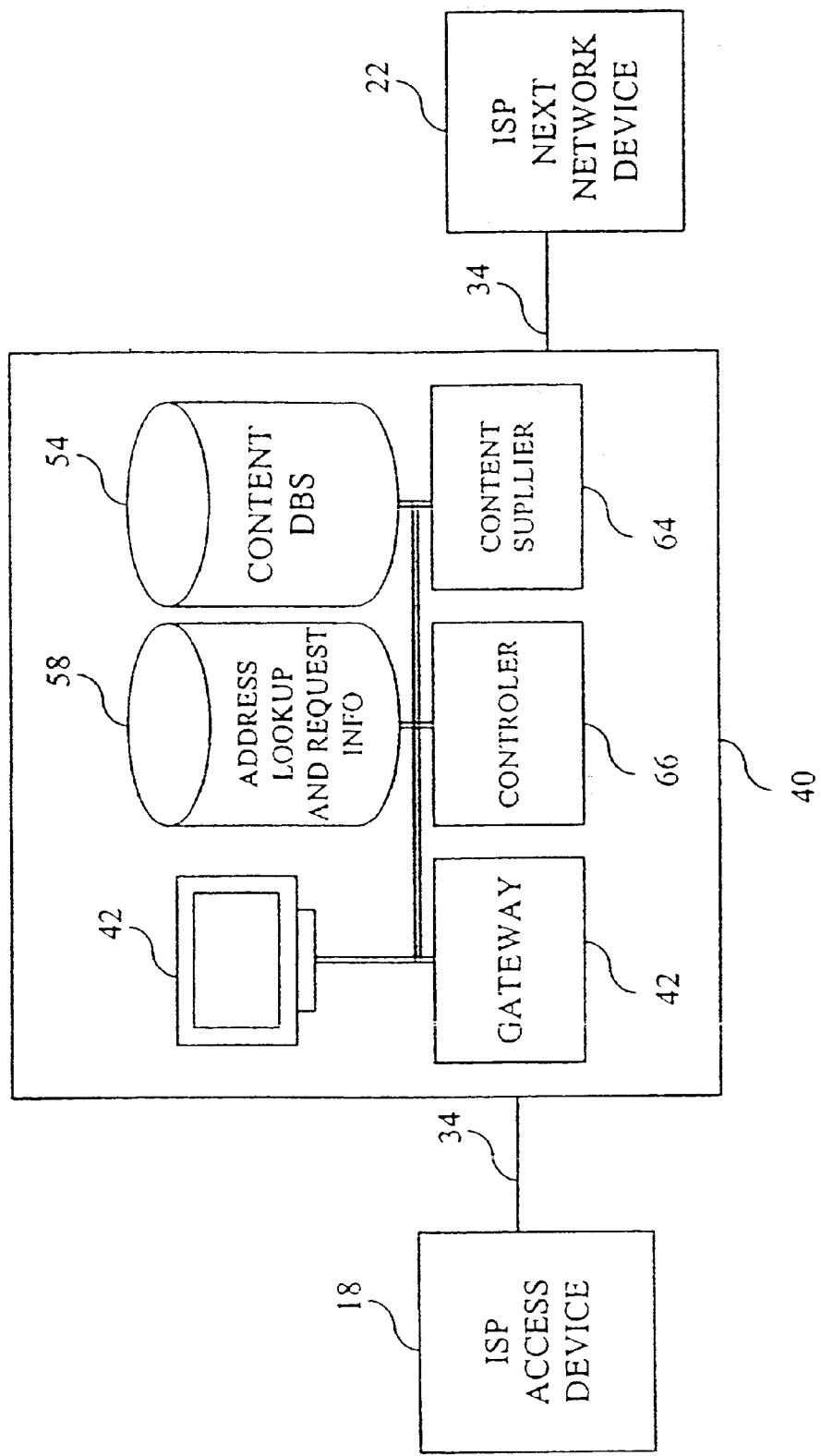
FIG. 3 is a detailed flowchart representation of the content injector of FIG. 2 constructed in accordance with the present invention.

FIG. 3 depicts a detailed configuration of content injector 40 of FIG. 2. As shown, content injector 40 contains a gateway 42, a controller 66, two storage devices 54 and 58, a content supplier 64, which is responsible for assigning external content to the original request when needed, and a system administrator 42. Information flows on the network in the form of packets, as is well known to those skilled in the art. The location of content injector 40 in FIG. 2 is chosen so that data flow to or from a particular device of the network, such as a workstation, client access device or a router, appropriately can be controlled. Thus, packets, which flow to/from clients 12 can be controlled. The unit of the content injector 40 can be realized, for example, on a PC computer having an Intel Pentium II processor, with a 10 GB hard disk and 64 MB of RAM. Content injection 40 may also be an embedded CPU.

Content injector 40 operates using an "addition policy" (as hereinafter explained in detail), which is determined by system administrator 42. The addition policy determines whether to add external content to a client's content request or to pass the request transparently. The addition of the external content is accomplished without changing the original request or the requested content. The system administration configures the addition policy via a graphical interface and stores it on controller 66. An example of such a policy rule might be to add content every 10-seconds to a client request.

Another method of configuring the addition policy is by using a central policy controller which transmits a specific customized addition policy and external content to a specified ISP. The central policy controller can be located anywhere on the network, for example on a server remote from the ISP. Such a server can communicate with the content injector 40 of the ISP via the Internet connection, through a dial-up connection or any other appropriate communication system.

Communication protocols are layered, which is also referred to as a protocol stack. The ISO (International Standardization Organization) has defined a general model which provides a framework for design of communication protocol layers. This model serves as a basic reference for understanding the functionality of existing communication protocols. Different communication protocols employ different layers of the ISO model, e.g. IP protocol. A full detailed explanation of ISO model and IP protocol can be found in the book entitled: "TCP/IP Illustrated, Volume 1: The Protocols" by W. Richard Stevens (Addison-Wesely Professional Computing Series 1994). A detailed explanation of TCP/IP protocol and protocols under IP can be found in the book entitled: "Internet Protocols Handbook" by Dave Roberts.

TABLE 1

ISO MODEL via IP protocol and IP protocol suite

| Layer | ISO layer Functionality | IP protocol layers | IP protocol suite |
|---|---|---|---|
| 7 | Application | Application | HTTP, FTP, TELNET, |
| 6 | Presentation | | SNMP, SMTP, NNTP |
| 5 | Session | Session | TCP, UDP |
| 4 | Transport | | |
| 3 | Network | Network | IP |
| 2 | Data link | | |
| 1 | Physical | | |

Referring to Table 1 above, layer 1 provides the physical electrical connection to a transmission medium. This layer may be the wire connection used to connect several network devices together. Layer 2 creates and controls the physical data link of communication between two end points. Layer 3 addresses network packets, e.g. Internet Protocol (IP) packets, and routes them to provide end-to-end communication between two network hosts, through intermediate hosts. Layer 4 transfers data reliably or unreliably, e.g. Transport Control Protocol (TCP) for reliable transfer or User Datagram Protocol (UDP) for unreliable transfer. Reliable transfer involves creation of a connection (a "virtual circuit") and then termination of the connection on completion of the session.

Layer 5 opens a session (a "virtual connection") between two hosts, controls the session between the two end points, and then closes the session. Layer 6 formats data to preserve its meaning. Layer 7 provides the user interface and implements the services to complete the application's purpose, e.g. File Transfer Protocol (FTP), E-MAIL, HTTP (browsing), TELNET, etc.

Content injector 40 of the present invention operates on a client request for content. A user is a person who operates a client computer/network device which is connected to the Internet Service Provider (ISP), or a computer/network device, which is connected to the above network and can interact with the network automatically or through programming. A client request for content from a remote server can be accomplished using a connected protocol, e.g. TCP, an unconnected protocol e.g. UDP, or any other protocol.

The exchanged information between server and client flows through the network in IP packets that contain higher layer protocols, which contain the client request for information or the desirable content. The process in which client and server exchange information is referred to as an "interactive session". The interactive session is characterized by an initial phase where the client initiates a content request, an information exchange phase where the client sends/receives content to/from a server, and a termination phase where the interactive session is terminated. Content can be any form of electronic information, including but not limited to text, web pages, pictures or graphics of any known format audio, computer applications or software component, files, videos, etc.

Figure 4A:
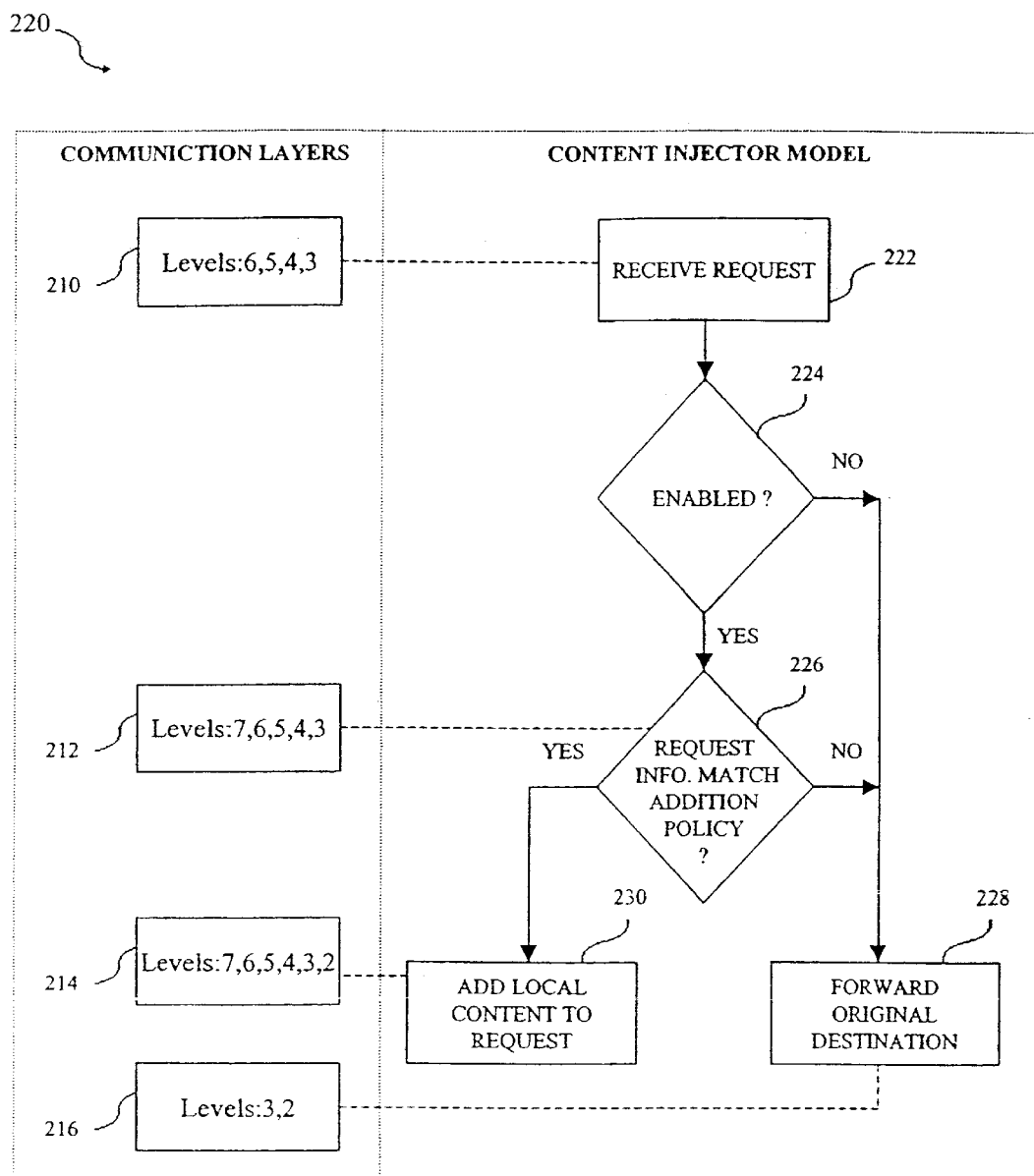
FIG. 4A depicts one manner of operation of the content injector of the present invention.

FIG. 4A depicts the manner in which content injector module 40 using a content injector module generally indicated at 220 is utilized within the ISO model. This figure shows which ISO communication layers (marked 210, 212, 214, and 216) are assigned to each task. As shown, content injector 40 uses all network layers 1–7. A client request entering the computer on which content injector 40 resides is diverted to content injector module 220. The request is received in a task 222. Task 224 checks to see if the content injector is enabled. If it is enabled, control passes to a task 226. If not enabled, the request is forwarded to its original destination via a task 228. In task 226, the request for information is verified against the content addition policy, and a determination is made whether to add external content. If the decision is to add external content, control is passed to task 230. If the decision is not to add external content, control passes to task 228 and the original request is forwarded to the destination. Task 230 adds external content to the original content request.

FIG. 4B depicts IP, TCP and UDP headers format. Using these known formats, the content injector is able to analyze a client request and to respond accordingly. This process will be illustrated using task 222 and task 226 of FIG. 4A. Task 222 receives IP packets and sorts them using the source IP address which is extracted from the IP header (layer 3 at Table 1). To identify the beginning of a new session, the content injector uses information from the flags field located in the TCP header (layers 4–5). Using OSI layers 3–5 information (Table 1), the content injector identifies a client's session initiative.

Task 226 decides if external content will be added or not using information from layer 3–7 and the pre-configured addition policy. A basic addition policy can be based on, for example:

a) Time interval (e.g. 60 seconds) implemented by using client IP address extracted from IP header (layer 3);

b) Remote host information (e.g. "port" no. 720, host name) extracted from TCP header (layers 4–5); or c) Type of requested content by the HTTP protocol (e.g. html page, keywords, image, etc.) which is extracted from the data transported by the TCP (layers 6–7).

The above explanation also applies to FIG. 6 as described hereinafter. Additional information on Internet protocols can be found in the Stevens text referenced above.

Figure 5:
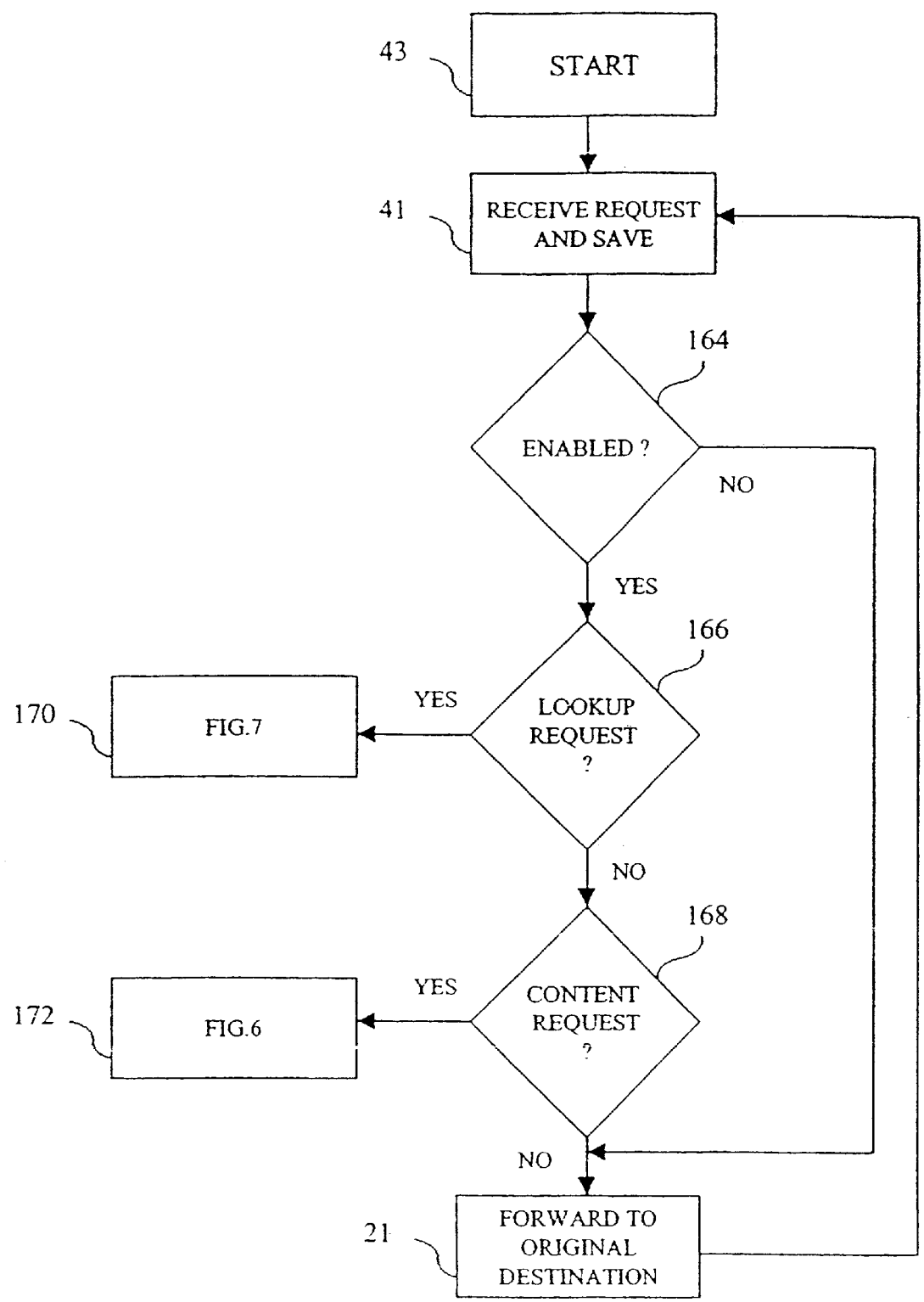
FIGS. 5 through 7 are flowchart representations depicting the steps performed by the method and system of the present invention.
Figure 6:
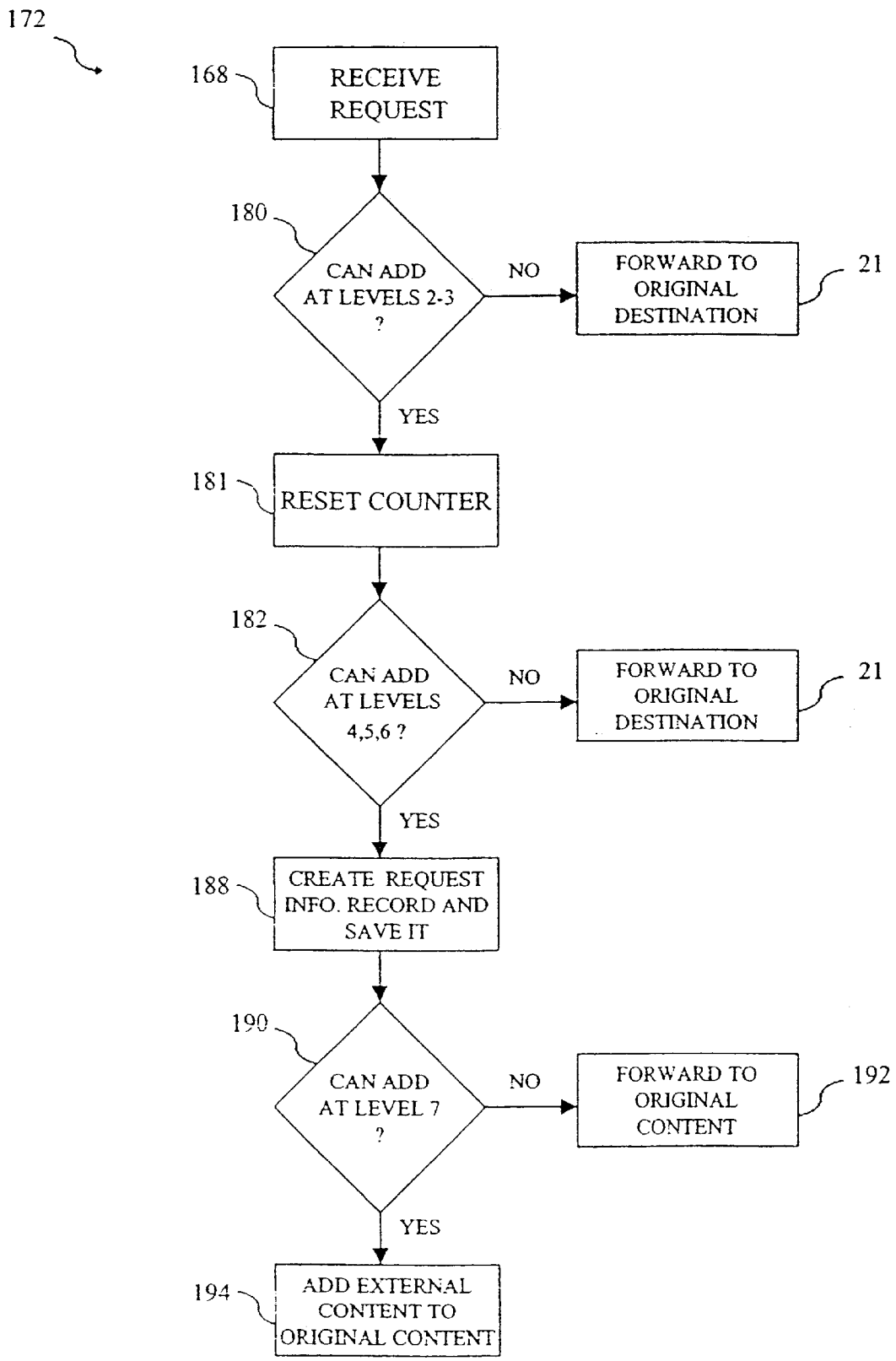
Figure 7:
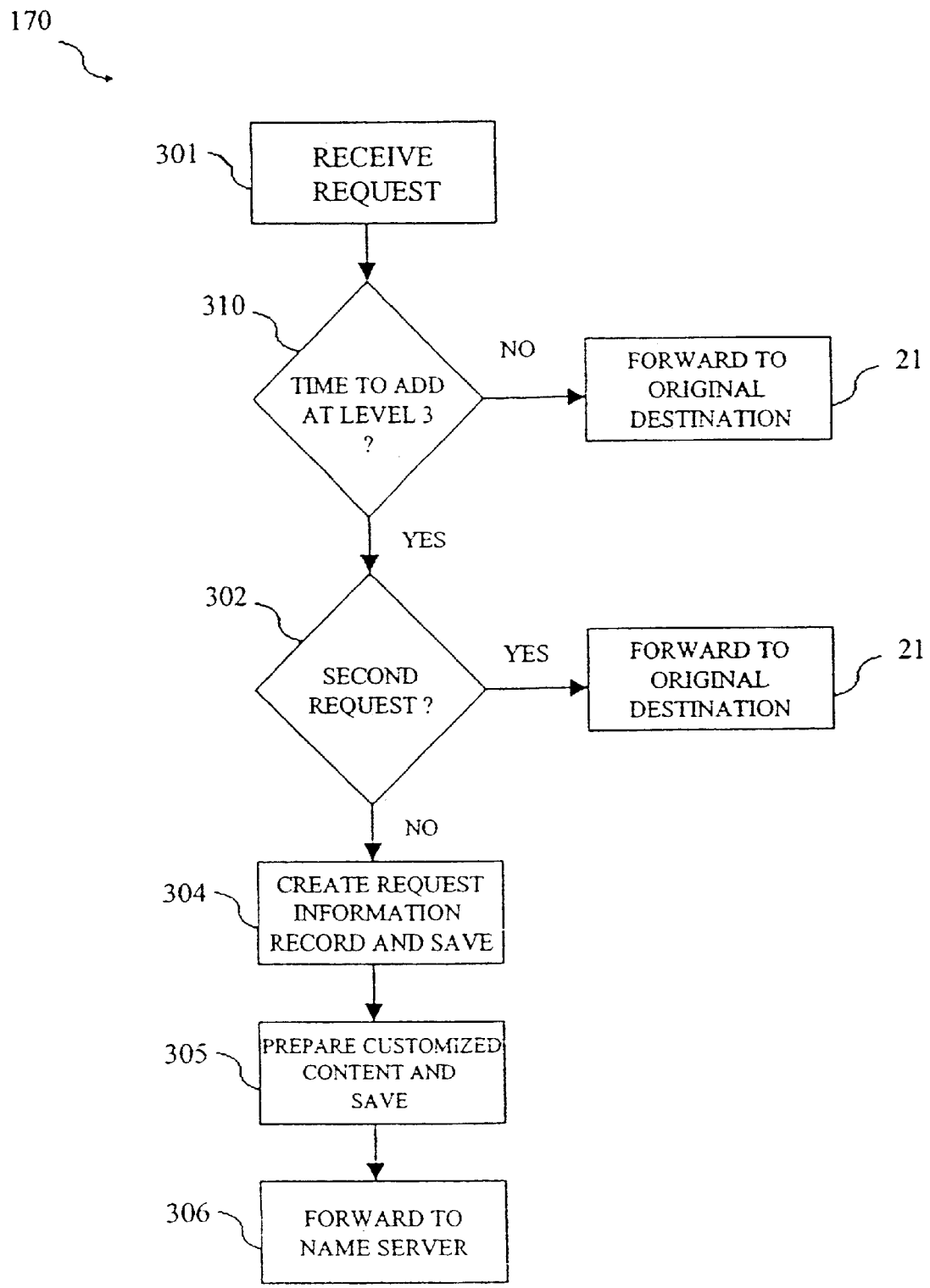

FIGS. 5–7 depict a detailed flow diagram of the method performed by content injector module 220 of FIG. 4A. The detailed descriptions in FIGS. 5–7 further define content injector module 40.

FIG. 5 shows the process that handles a client request for content entering gateway 42 (FIG. 3). As mentioned above, a client request is assembled from IP packets, which contains upper protocols and request information. The request flows from the client to the ISP in IP packets and is received by gateway 42, which sorts and analyzes between various client requests.

The process starts in task 43 where content injector 40 is connected and turned on. Task 41 (which generally corresponds to task 222 in FIG. 4A) receives all requests coming from clients and stores them in storage device 58 (FIG. 3). Task 164 reads the request from storage device 58 and checks to see if the content injector is enabled. If it is enabled, the request is forwarded to task 166; otherwise, the request is forwarded to its original destination at task 21, e.g. the remote server. Task 21 corresponds to task 228 of FIG. 4A. Task 166 checks to see if the request contains an "address lookup request", i.e., a DNS request. If it does, the request is forwarded to task 170 (see FIG. 7); otherwise it is forwarded, to task 168. Task 168 identifies the initial phase of the interactive session request. If content is requested, the request is forwarded to task 172 (see FIG. 6); otherwise, it is forward to its original destination 21. Task 21, after performing, returns control of the process to task 41.

FIG. 6 shows the process which handles the various client requests in which external content is added, or requests which are passed transparently. The system keeps a time-counter for each client, which is recognized by a unique IP address assigned to that client while connected to the Internet. The time-counter "decides" when to add external content to client's request. The addition is made when the client initiates a request.

Task 180 uses communication layers 2–3 to identify the beginning of the client request. The task checks the client time-counter by extracting the IP address from the client's IP packets (layer 3) by comparing them with the clients "time counter table". The "time counter table" saves updated time counter readings for each client. If the time counter indicates not to add external content, the request is directed to its original destination 21. If it indicates to add external content, the time-counter for this client is reset at task 181 and its request is directed to task 182.

Task 182 checks to see if the addition policy applies to protocols at ISO layers 4–6 for this request. Task 182 checks which application information this protocol transfers at the upper protocol layers 6–7, e.g. HTTP, FTP, and the like. The task is done by extracting information from header protocol of layers 4–5, e.g. header format (TCP,UDP), or port number (which usually associates to application protocol, e.g. HTTP, FTP, etc.). If the protocol information does not conform to the addition policy the request is directed to its original destination 21. If it does conform, the request is directed to task 188 and saved in the request table in storage 58 which contain requests to which external content might or might not be added.

Task 190 checks to see if the request application information at protocol layer 7 (which is transferred by protocols at layers 4–6) conforms to the addition policy, e.g. the adding is made at HTTP protocol request. If the application information conforms to the addition policy, external content is added at task 194. If not, the request is forwarded to task 192. Task 192 directs the client's request to retrieve its original requested content. The direction is done by forwarding the client's request to the remote server (which stored the original content) or to a location in the storage device 54 (FIG. 3) to where the original content has been transferred.

Task 194 adds external content to the client's request by a process which sends that content piggy-backed on the response for the request for the original content. The request for the original content can be done using two methods. The first method directs the original request to the remote server in which the original content is stored. The second method directs the request to a location in storage device 54, where the original content has been transferred while the external content is sent to the client. The external content is derived from content supplier 64 of FIG. 3 using client information request (at layers 1–3 plus application information) and information from content database storage 54.

FIG. 7 shows the process that handles client's address lookup request (DNS request). Task 301 receives the request after identifying it in FIG. 5, at task 166. Task 310 checks to see if it is time to add external content to client's request. The process is done in a similar way to the process that takes place in FIG. 6, at task 180. If the time field in the "time counter table" indicates not to add external content, the request is directed to its original destination, namely, task 21. Otherwise, it is directed to task 302. Task 302 checks to see if the request already exists in the "lookup database table" (part of storage unit 58 in FIG. 3) by comparing the request information to the lookup database. If the request is found in the database, it is directed to its original destination, namely, task 21. Otherwise it is directed to task 304. Task 304 saves the request details in lookup database 58 while creating external content for the client's content request that is about to follow at task 305. As known in the art, a DNS request precedes a content request from a remote server. Meanwhile, the request is directed to DNS 20 at task 306.

Figure 8A:
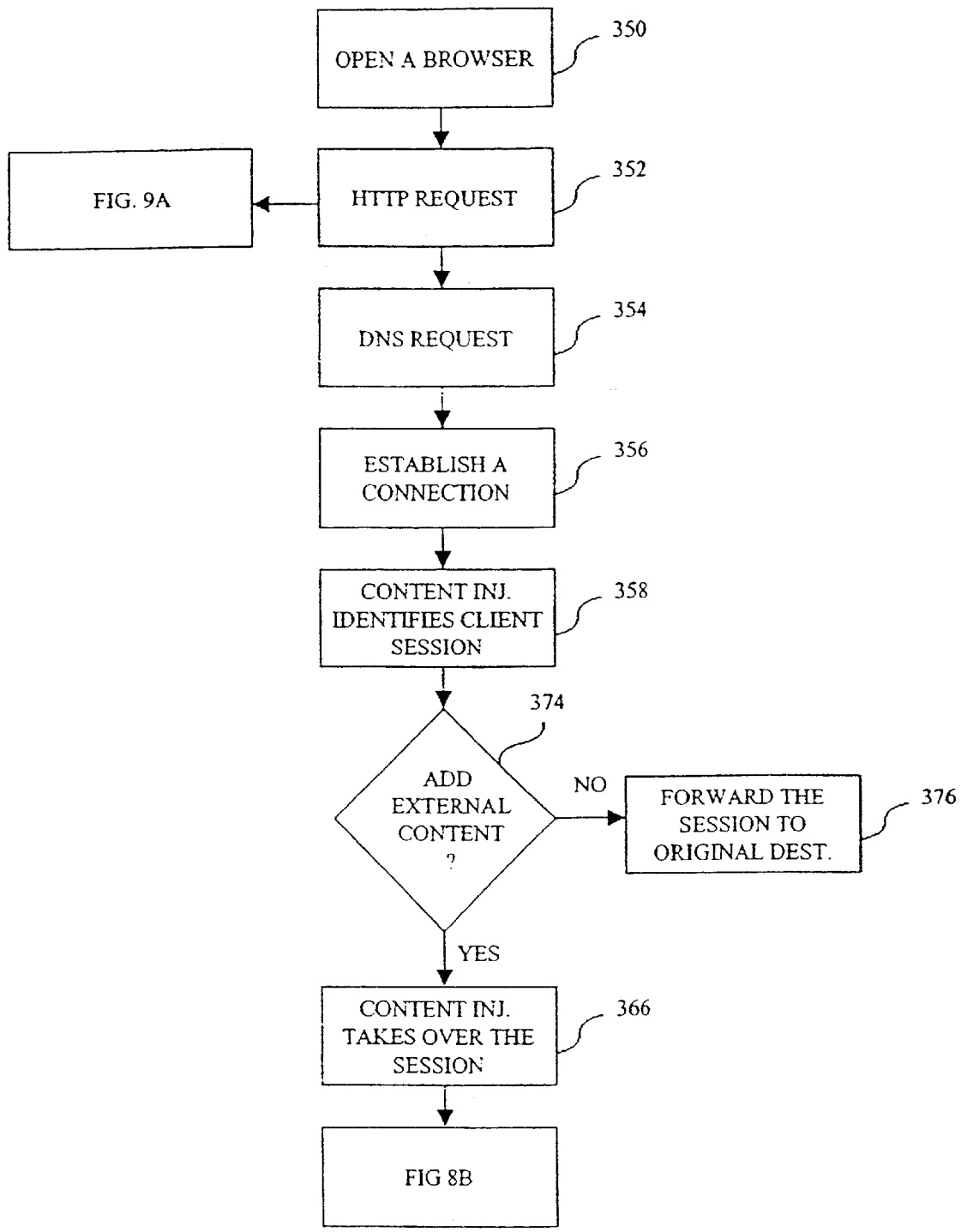
FIGS. 8A and 8B are flowchart representations depicting the steps performed in a sample application of the present invention.
Figure 8B:
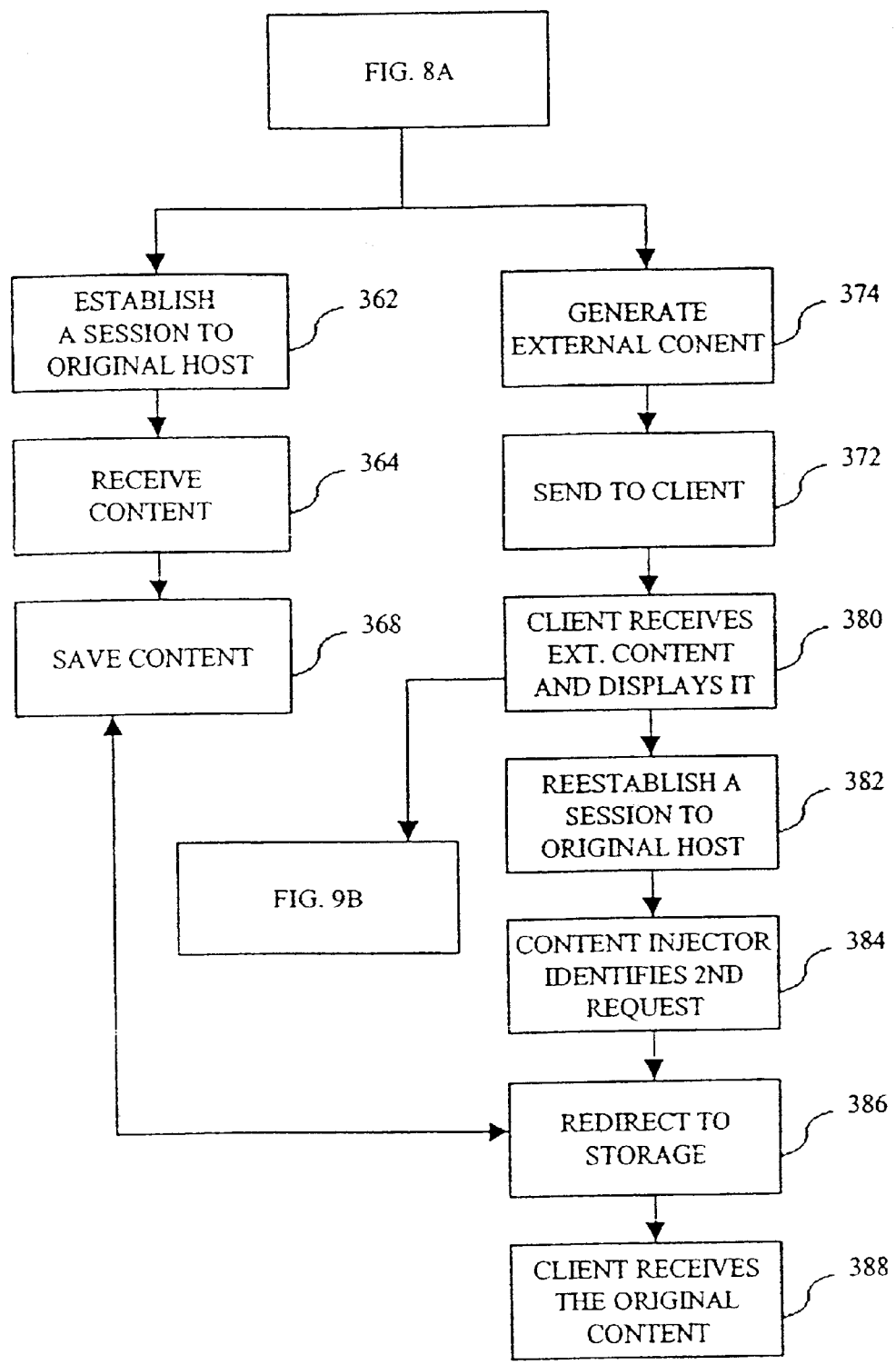
Figure 9A:
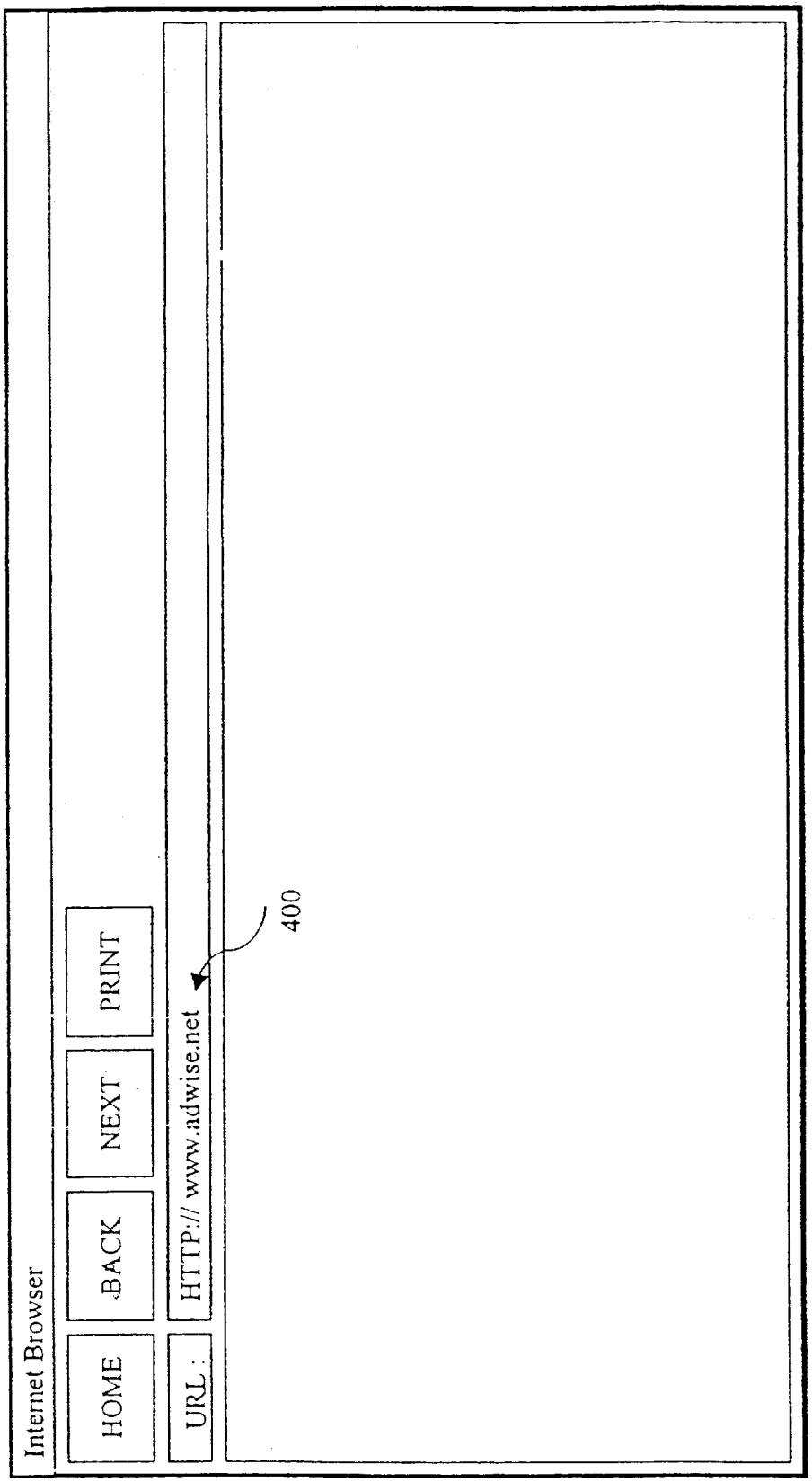
FIGS. 9A through 9C depict views which may be seen on a web browser in connection with the present invention; and, FIGS. 10A through 10C are timing charts depicting the manner in which the present invention may be used in conjunction with network idle time.

Reference is now made to FIGS. 8A and 8B to describe a particular example using the present invention. A user of client 12 opens an Internet browser at step 350. Client 12 initiates an HTTP request by the user typing the URL of an Internet web server e.g.: www.adwise.net, at a step 352. FIG. 9A depicts the entry of such a request in, for example, an Internet Explorer web browser from Microsoft. Alternatively, a hypertext link on the browser, or other shortcut, may be activated. Client browser 12 queries Domain Name Server (DNS) 20 to resolve the web server name to an IP address at step 354. The browser attempts to establish a session to the requested server over the Internet 32 at step 356. As is known, this attempt usually involves a certain delay.

Content injector 40 identifies the client attempt to establish a session to a remote server: www.adwise.net at step 358. Content injector 40 determines whether or not to add external content to the client session at step 374. If "no," the session is forwarded to its original destination www.adwise.net at step 376. If "yes," content injector 40 identifies itself as www.adwise.net and takes over the session, instead of forwarding the session to www.adwise.net at step 366. Content injector 40 establishes a separate session to www.adwise.net at step 362 and receives the content intended for the client at step 364, and saves the content at step 368 in storage medium 54 from FIG. 3.

Figure 9B:
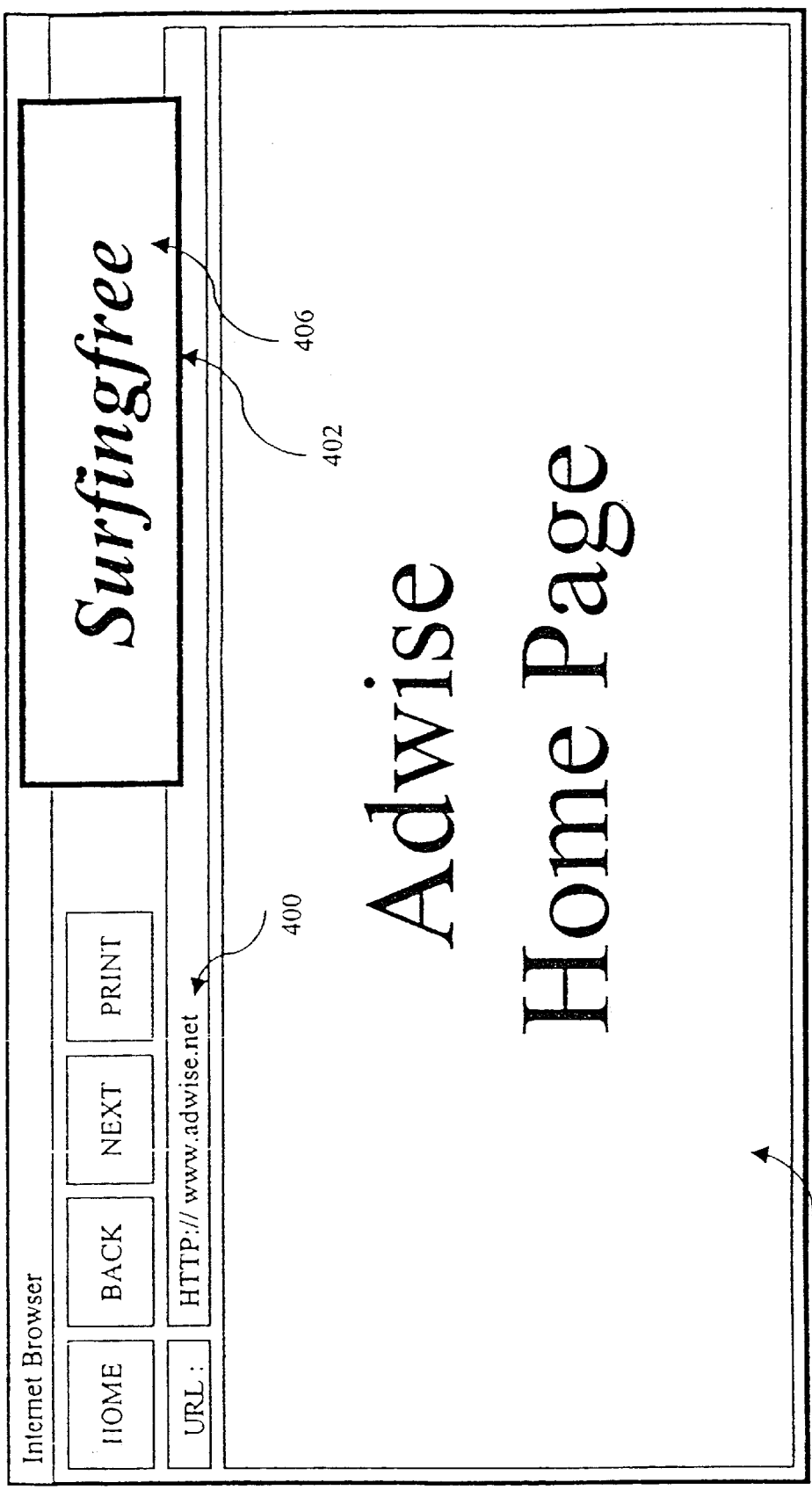

In parallel to such processing, content injector 40 generates external content customized to the current session at step 374 and sends it to the client at step 372. The external content is typically a visual image or an HTML page, which is included in the HTML generated by the content injector. The client's browser receives and displays the external content at step 380. FIG. 9B depicts the client browser screen after local external content has been displayed. While displaying the external content, the browser reestablishes a session to www.adwise.net at step 382. Content injector 40 identifies this second request at step 384 and redirects the request to storage medium 54 at step 386 in which the requested content was previously received for the client. The client receives the original content at step 388. The process is repeated for each established session. The decision whether the add external content is made again as set forth above.

Figure 9C:
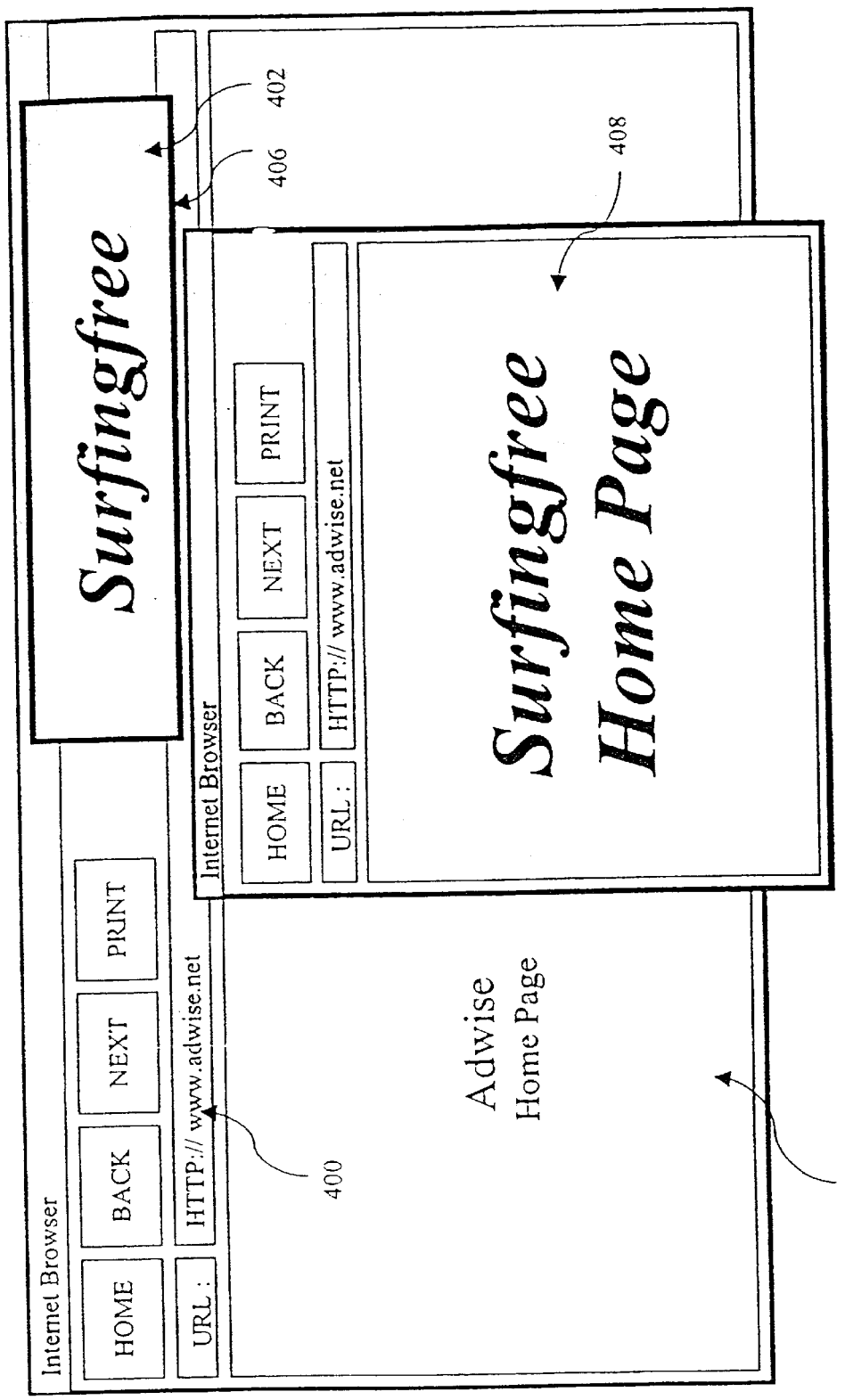

Referring now to FIGS. 9A, 9B, and 9C, FIG. 9A depicts a typical internet browser screen layout with the URL or domain name (host address) 400 (for example: www.adwise.net) shown entered in the address window of the browser.

FIG. 9B depicts the screen layout of FIG. 9A following the client's request for content. The external content 402 is shown, for example, as an overlay window including a clickable banner 406 containing a hyperlink. The original requested content 404 may appear (almost simultaneously) with the external content 406. In certain cases, the external content can be shown on the client browser as, for example, a clickable banner which is displayed until the original content arrives as shown in FIG. 9C. At will, the user clicks banner 406 to activate the hyperlink and receives associated content 408, shown in a new browser window.

Figure 10A:
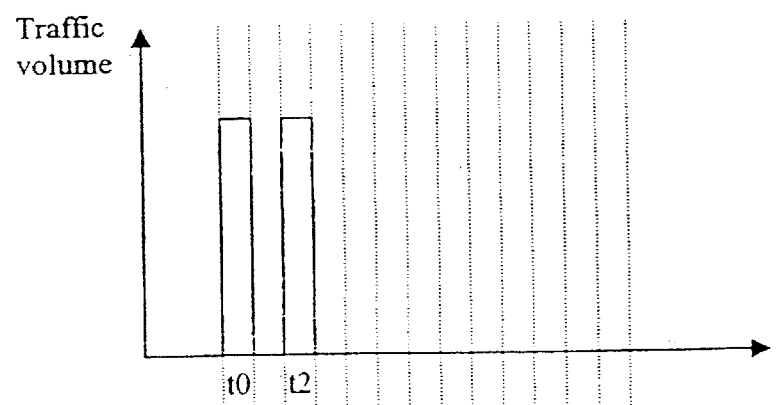
Figure 10B:
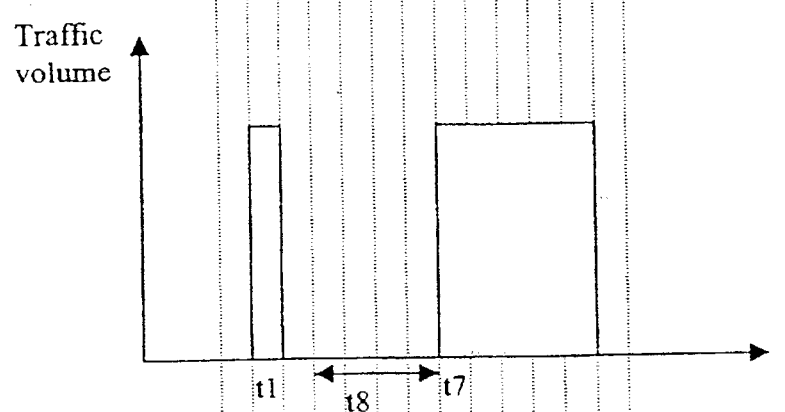

As a further explanation to FIGS. 8A and 8B, FIGS. 10A, 10B and 10C show how content injector 40 may use network idle time for content injection. FIG. 10A shows traffic generated by the client. Time slot t0 represents client DNS request (task 354 in FIG. 8A). This request is answered by a DNS server at time slot t1 in FIG. 10B. Following the DNS request, the client initiates an HTTP request to a host (task 356). This request is represented by time slot t2 in FIG. 10A. Due to the fact that an HTTP request involves creation of a session between a client and a host, and requests processing by the host, there is a time delay until the client receives the requested content and the content is fully loaded on the client browser. This time delay is represented by time slot t8 in FIG. 10B.

Figure 10C:
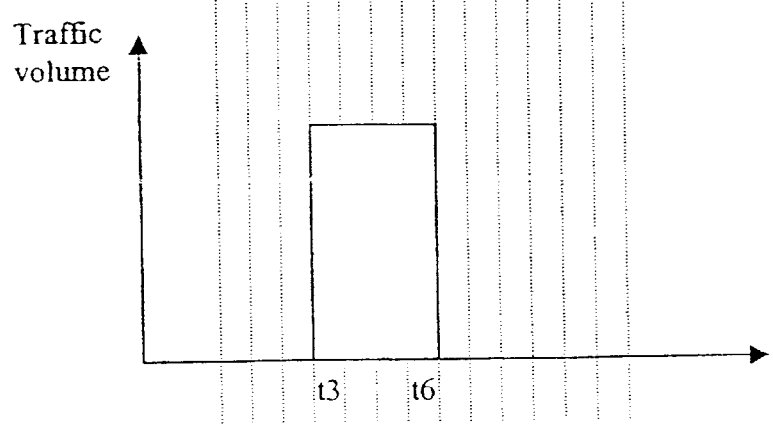

FIG. 10C shows how content injector 40 utilizes the client line while waiting for the requested content. The external content is sent (task 372) between time slots t2 and t7 shown as t3 through t6 in FIG. 10C. As the content injector brings the content to the client in a separate session, the client is free to accept the external content. The external content is designed to fit the delay window between the client request and the original content arrival (task 388). It is noted that time slots t0, t1, etc. are usually unequal and depend on network performance.

A glossary of common communication and Internet expressions as used herein is set forth below:

| | |
|---|---|
| BROWSER: | A client program that allows users to read hypertext documents on the World Wide Web, and navigate between them. Examples are Netscape Navigator, Lynx, and Microsoft Internet Explorer. Browsers can be text-based or graphic. |
| DNS: | Domain Name System. A database system that translates an IP address into a domain name. For example, a numeric IP address such as 232.452.120.54 can become a domain name such as xyz.com. |
| E-MAIL: | Electronic mail. A service that sends messages on computers via local or global networks. |
| FIREWALL: | An electronic boundary that prevents unauthorized users from accessing certain files on a network; or, a computer used to maintain such a boundary. |
| FTP: | File Transfer Protocol. A client/server protocol for exchanging files with a host computer |
| HTTP: | Hypertext Transfer Protocol. The protocol most often used to transfer information from World Wide Web servers to browsers, which is why Web addresses begin with http://. Also called Hypertext Transport Protocol |
| HUB: | Like the hub of a wheel, a central device that connects several computers together or several networks together. A passive hub may simply forward messages; an active hub, or repeater, amplifies or refreshes the stream of data, which otherwise would deteriorate over a long distance. |
| IP: | Internet Protocol. The IP part of TCP/IP; the protocol that is used to route a data packet from its source to its destination over the Internet. |
| ISO: | International Organization for Standardization. A voluntary organization founded in 1946, comprised of the national standards organizations of many countries, and responsible for creating international standards in many areas, including computers and communications. ANSI (American National Standards Institute) is the American member of ISO. ISO produced OSI (Open Systems Interconnection), a seven-layer model for network architecture. |
| ISP: | Internet Service Provider. A company that provides Internet accounts. |
| LAN: | Local Area Network. A network that connects computers that are close to each other, usually in the same building, linked by a cable. |
| NNTP: | Network News Transfer Protocol. Internet protocol for connecting to Usenet newsgroups and post messages. |
| ROUTER: | A device that finds the best path for a data packet to be sent from one network to another. A router stores and forwards electronic messages between networks, first determining all possible paths to the destination address and then picking the most expedient route, based on the traffic load and the number of hops. A router works at the network layer (layer 3 of the OSI model); a bridge works at the data link layer (layer 2). A router does more processing than a bridge does. |
| SMTP: | Simple Mail Transfer Protocol. A server-to-server protocol for delivering electronic mail. The standard protocol used on the Internet; also used on other TCP/IP networks. |
| SNMP: | Simple Network Management Protocol. The Internet standard protocol for network management software. Using SNMP, programs called agents monitor various devices on the network (hubs, routers, bridges, etc.). Another program collects the data from the agents. The database created by the monitoring operations is called a management information base (MIB). This data is used to check if all devices on the network are operating properly. |
| TCP: | Transmission Control Protocol. The most common Internet transport layer protocol, defined in STD 7, RFC 793. This communications protocol is used in networks that follow U.S. Department of Defense standards. It is based on the Internet Protocol as its underlying protocol; TCP/IP means Transmission Control Protocol over Internet Protocol. TCP is connection-oriented and stream-oriented, and provides for reliable communication over packet-switched networks. |
| TELNET: | (TN). A terminal emulation protocol that lets a user log in remotely to other computers on the Internet; it has a command line interface. Originally developed for ARPAnet, Telnet runs on top of the TCP/IP protocol. |
| UDP: | User Datagram Protocol. A communications protocol for the Internet network layer, transport layer, and session layer, which makes it possible to send a datagram message from one computer to an application running in another computer. Like TCP (Transmission Control Protocol), UDP is used with IP (the Internet Protocol). Unlike TCP, UDP is connectionless and does not guarantee reliable communication; the application itself must process any errors and check for reliable delivery. |

Accordingly, the present invention provides a system and method of injecting external content into a client/server interactive session, such as a web browsing session, without interfering with regular communications. The content can be selectively customized and provide advertisements, information, news and the like, especially during the normal period of delay between a request for a particular web page and its actual delivery and loading.

It will thus be seen that the objects set forth above, among those made apparent from the preceding description, are efficiently attained and, since certain changes may be made in carrying out the above methods and in the systems set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for injecting external content into a computer network interactive session comprising the steps of:

a. receiving an electronic request from a client for selected content from a specified address location;

b. determining, based on predetermined criteria whether to deliver external content to said client;

c. upon determining to deliver said external content, transmitting said external content to said client and transmitting said request for selected content to said specified address location for response; and d. upon determining not to deliver said external content, transmitting said request for selected content to said specified address location for response wherein said request for selected content is transmitted to said specified address location substantially unaltered.

2. The method for injecting external content as claimed in claim 1, wherein said predetermined criteria includes an addition policy.

3. The method for injecting external content as claimed in claim 2, wherein said addition policy uses at least one of a time interval, remote host information and type of requested content to determine whether to deliver external content to said client.

4. The method for injecting external content as claimed in claim 1, further comprising the step of storing said received electronic request in a storage device.

5. The method for injecting external content as claimed in claim 4, wherein said predetermined criteria includes whether an electronic request is similar to a stored electronic request.

6. The method for injecting external content as claimed in claim 1, further comprising the step of displaying said external content at said client until said selected content is delivered to said client.

7. The method for injecting external content as claimed in claim 1, wherein said client is a computer having a display device.

8. The method for injecting external content as claimed in claim 1, further comprising the step of displaying said external content at said client for a predetermined time.

9. The method for injecting external content as claimed in claim 1, further comprising the step of displaying said external content at said client along with said selected content.

10. The method for injecting external content as claimed in claim 1, wherein said electronic request received from said client is in the form of a packet.

11. The method for injecting external content as claimed in claim 10 wherein said packet includes at least one of a content type information and a specified address location information.

12. The method of claim 1 wherein said transmitting of said request for selected content to said specified address location is performed without waiting for a response of said client to said external content.

13. The method of claim 1 further comprising the step of:
e. upon receipt of a response to said request for selected content, transmitting said response to said client substantially unaltered.

14. A method of browsing in a computer network having at least one client computer electronically connectable to the Internet, said client computer being adapted to transmit requests for selected content to a specified address location and to allow downloading of requested selected content from said location on the Internet, comprising the steps of:
a. receiving a request for selected content from a client computer, said selected content being located at a specified address location;
b. intercepting said request for selected content upon delivery to said specified address location;
c. selectively delivering external content in addition to said selected content to said client computer for display; and
d. transmitting said request for said selected content to said specified address location wherein said request for selected content is transmitted to said specified address location substantially unaltered.

15. The method of browsing as claimed in claim 14, further comprising the step of receiving said selected content.

16. The method of browsing as claimed in claim 15, further comprising the step of delivering said selected content to said client computer.

17. The method of browsing as claimed in claim 14, wherein a computer network delay occurs over the Internet, said external content being delivered to said client computer during said delay.

18. The method of browsing as claimed in claim 14, wherein said external content is delivered to said client computer without changing said request for selected content.

19. The method of browsing as claimed in claim 18, wherein said external content is delivered to said client computer without changing said selected content.

20. The method of claim 14 wherein said transmitting of said request for selected content to said specified address location is performed without waiting for a response of said client to said external content.

21. The method of claim 14 further comprising the step of:
e. upon receipt of a response to said request for selected content, transmitting said response to said client substantially unaltered.

22. An automated system which allows for the delivery of external content to a web browser of a client coupled to the Internet through an ISP, comprising an ISP junction which receives a request for a web page directed to a specified address from said client, said ISP junction including a content injector, said content injector including access to an addition determining system which selectively determines when to deliver external content to said client based on predetermined criteria, and a transmission system which transmits said request for a web page to the specified address.

23. The automated system as claimed in claim 22, wherein said content injector includes a system administrator.

24. The automated system as claimed in claim 22, wherein said content injector is a computer.

25. The automated system as claimed in claim 22, wherein said content injector is an embedded CPU.

26. The automated system as claimed in claim 22, wherein said content injector further includes external content for delivery to said client computer.

27. The automated system as claimed in claim 22, wherein said addition determining system uses an addition policy to determine whether to deliver external content to said client.

28. The automated system as claimed in claim 27, wherein said addition policy uses at least one of a time interval, remote host information and type of requested content to determine whether to deliver external content to said client.

29. The automated system as claimed in claim 27, where said addition to determining system uses a central policy controller to configure said addition policy.

30. The automated system as claimed in claim 22, wherein said addition determining system is remotely located from said ISP.

31. The automated system as claimed in claim 22, wherein said content injector takes over control of a network session of said client over the Internet.

32. The automated system as claimed in claim 22, wherein said content injector further includes a transmission system for transmitting said external content to said client.

33. A system for injecting external content into a computer network interactive session, comprising a content injector including a processor, electronic storage and a gateway, wherein:
- a. said storage including external content information;
- b. said gateway including means for reading information packets transmitted from a client during a network interactive session, said packets including request information;
- c. said processor determining whether to deliver external content to said client by comparing said request information to predetermined criteria.

34. The system as claimed in claim 33, wherein said content injector further includes means for transmitting said external content to said client.

35. The system as claimed in claim 34, wherein said content injector further includes means for transmitting requested content to said client, said requested content associated with said request information.

36. The system as claimed in claim 35, wherein said content injector further includes means for adding a delay period of time before at least one of said transmitting said external content to said client and said transmitting requested content to said client.

37. The system as claimed in claim 33 further comprising a central policy controller which controls when to deliver external content to said client.

38. The system as claimed in claim 37, where said central policy controller is located remotely from said content injector.

* * * * *